Patented Dec. 21, 1926.

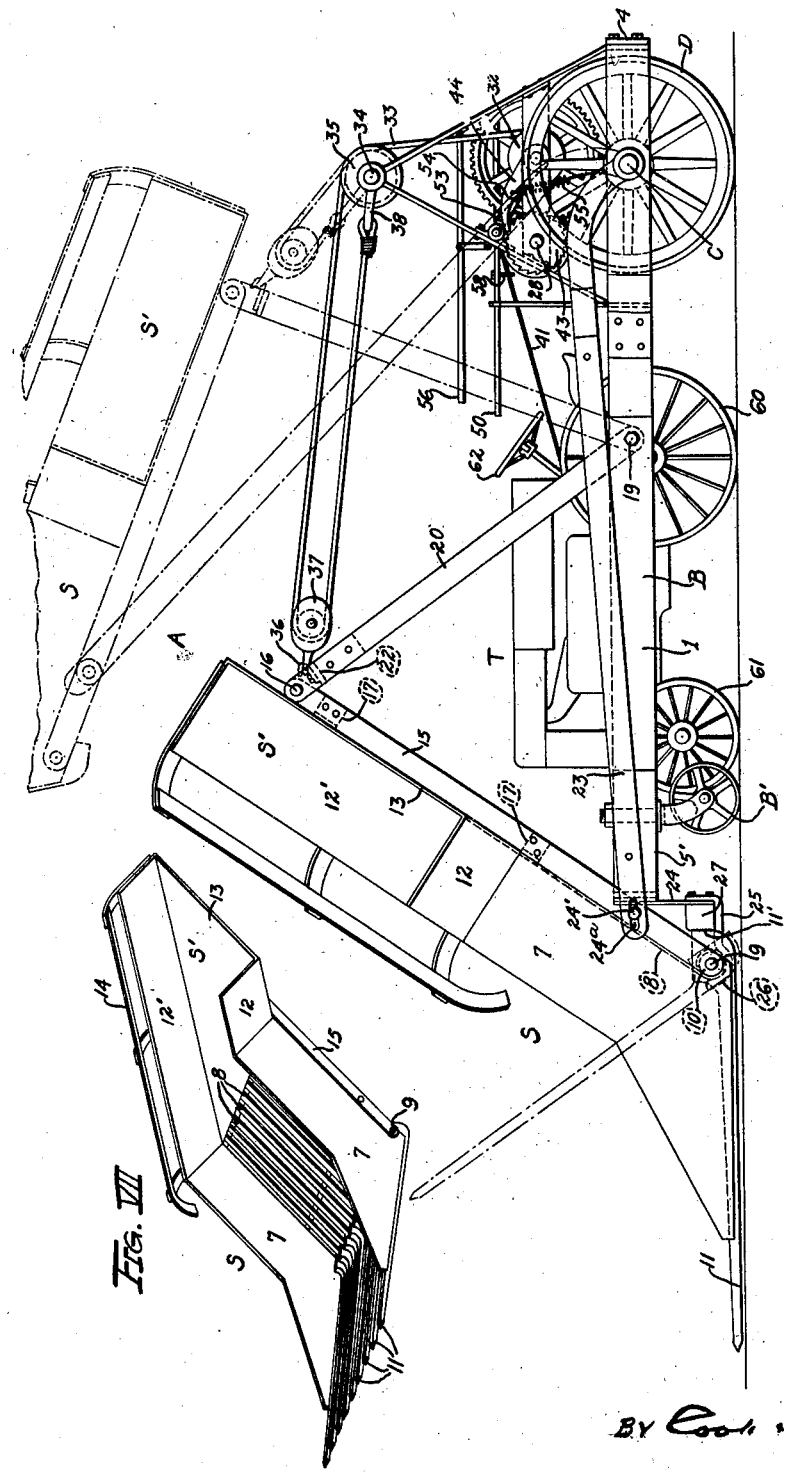

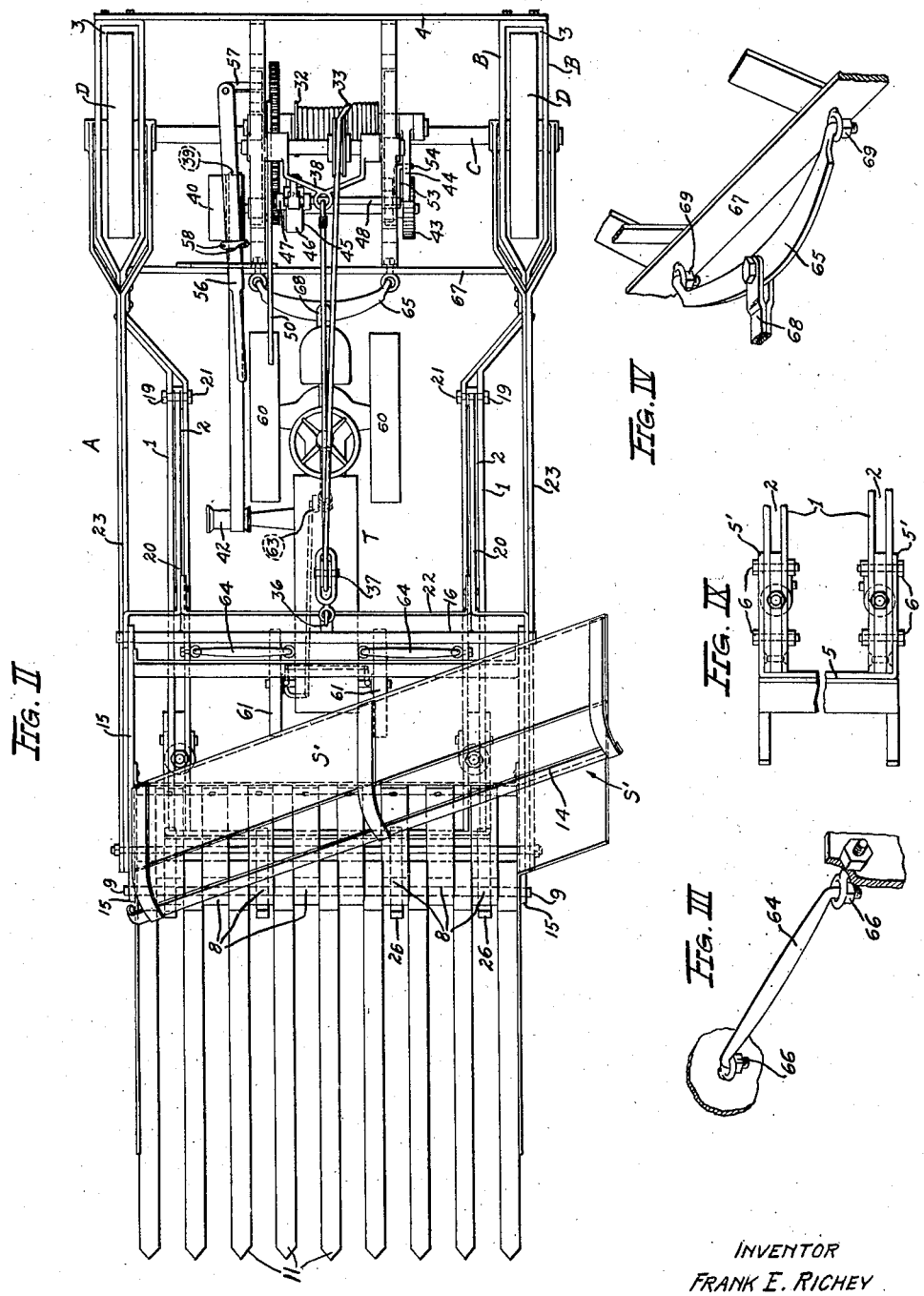

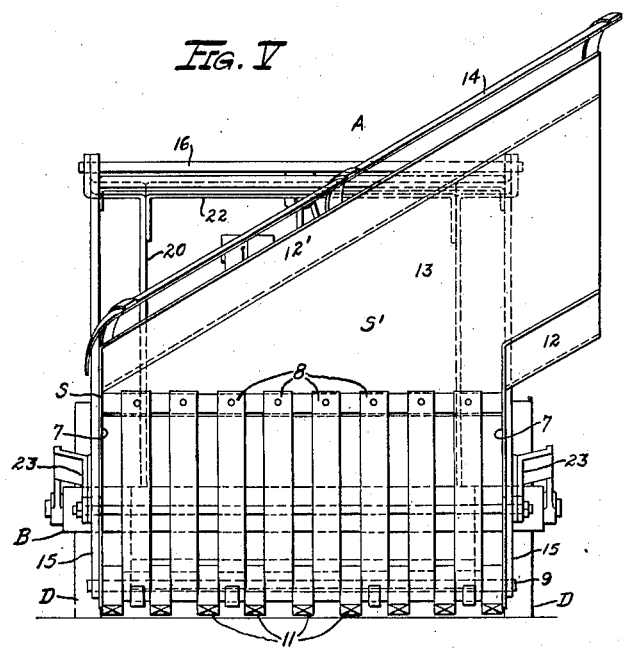
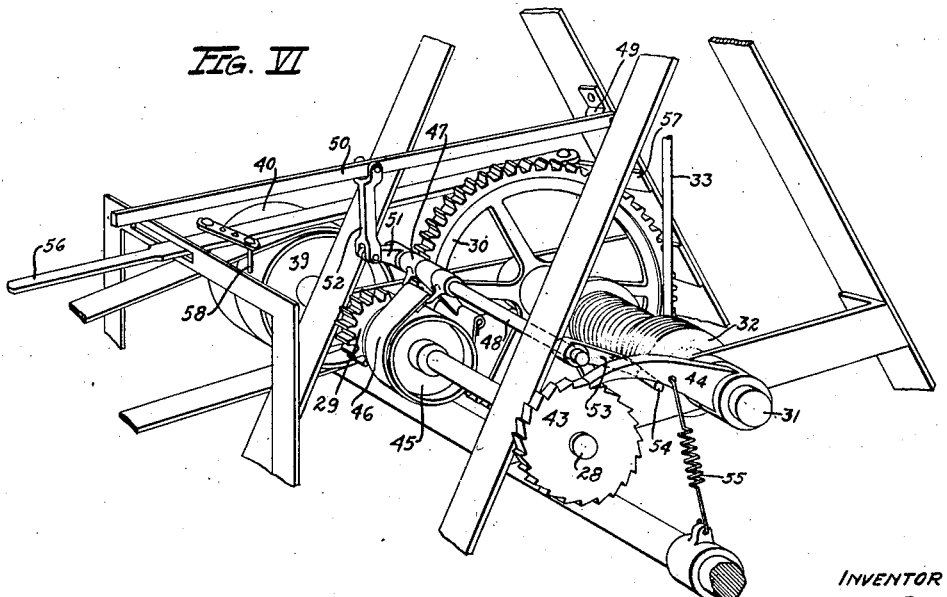

1,611,860

UNITED STATES PATENT OFFICE.

FRANK E. RICHEY, OF LA SALLE, ILLINOIS, ASSIGNOR TO FREDERICK DAVID RICHEY, OF CHEVY CHASE, MARYLAND.

FARMING APPARATUS.

Application filed November 24, 1924. Serial No. 751,874.

This invention relates generally to farming apparatus, and particularly to an apparatus which may be used to gather shocks of grain in the field, said shocks of grain being gathered by the apparatus in question as it moves along the ground and being dumped by said apparatus into a suitable conveyance, such as a wagon, which travels along in close proximity to the apparatus.

Prior to this invention shocks of grain were gathered by hand and were loaded into wagons by which they were conveyed to a threshing machine. This was a laborious and time-consuming task, and the main object of the present invention is to produce an apparatus which will move along a row of shocks of grain, gathering said shocks as they are encountered and depositing them in a wagon or other conveyance which travels along at the side of the apparatus. The apparatus disclosed in the present application is power-actuated; in other words, mechanical means is provided which causes the apparatus to move along the ground, and this mechanical means is also employed to actuate the dumping mechanism of the apparatus. By this arrangement a single operator is needed to gather the shocks of grain, thus performing in much less time work which was formerly done by a number of workmen.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a side elevation of my improved apparatus showing a portion of the device in dotted lines as it will appear when in a moved position.

Fig. II is a plan view of the apparatus illustrated in Fig. I.

Fig. III is a fragmentary perspective showing one of the connecting members for attaching the apparatus to the tractor which constitutes the means of propulsion and actuation of said apparatus.

Fig. IV is a fragmentary perspective view of another of the connecting members for attaching the apparatus to the power-generating means.

Fig. V is a front elevation of my improved apparatus.

Fig. VI is a fragmentary perspective view of the mechanism for controlling the scoop which forms a part of the dumping mechanism of my improved apparatus.

Fig. VII is a perspective view of the scoop of the apparatus.

Fig. VIII is a fragmentary section showing the lower portion of the scoop of the apparatus.

Fig. IX is a fragmentary plan view of the front portion of the apparatus.

In the drawings, A designates my improved farming apparatus, which comprises a rectangular frame B provided with a rear axle C at the opposite ends of which ground wheels D are mounted. The rectangular frame B is of greater width at its rear end than it is at its forward end, so that the ground wheels D may be a sufficient distance apart to properly support the apparatus. By referring to Fig. II of the drawing it will be seen that the side members 1 of the rectangular frame B each comprise a pair of bars which are separated from each other to provide spaces 2 at the forward portion of said frame. The bars of each of said members 1 are also separated from each other at the rear ends of said side members to provide spaces 3 within which the ground wheels D are arranged. Located at the rear of the frame B is a bar 4 which connects the side members 1 together, and arranged at the forward end of said frame B is a front member 5 which connects the side members 1 together at that point. By referring to Fig. IX it will be seen that the front member 5 is provided with flanges 5' which extend along the outer face of the side members, and that bolts 6 are passed through said flanges and said side members to secure the front member 5 to the frame. It is apparent from the arrangement shown that the front member 5 may be very readily removed from the frame by merely removing the bolts 6.

Adjacent to the forward end of the rectangular frame B of the apparatus I locate a pair of wheels B', said wheels being capable of rotating about a horizontal shaft and being supported by brackets which in turn are capable of rotating about vertical axes. From the foregoing it is plain that the wheels B' function in very much the same manner as caster wheels on articles of furniture, and that said wheels are capable of moving in various directions to permit free movement of the apparatus.

S designates a scoop which is arranged at the forward end of the apparatus, said scoop, as will be hereinafter clearly set forth, being adapted to gather up shocks of grain in the field as said shocks are encountered by the apparatus. The scoop S comprises a pair of side walls 7 at the lowermost portion of the scoop, between which is arranged a plurality of slats 8 spaced apart from each other to produce an upwardly inclined wall having longitudinal openings. Located at the lower end of the slats 8 is a transversely arranged shaft 9 about which the lower portions of said slats are bent, there being bushings 10 interposed between said shaft and the bent portions of said slats, as shown by dotted lines in Figs. I and VIII.

Arranged at the lower end of the scoop S is a plurality of bars 11, the rear ends of said bars being supported by the shaft 9, as shown in Fig. VIII, in such manner that said bars 11 are pivotally supported, and said rear ends of said bars are located between adjacent slats 8 and bushings 10. There is very close frictional contact between the end faces of the adjacent bushings 10 and the side faces of the bars 11, so that said bars may be moved in an arc of a circle about the shaft 9, and when so moved will be retained in any position in which they may be placed. The bars 11 are provided with sharp forward ends and each of said bars is provided with an inclined upper face, as shown in Fig. VIII. The upper portion S' of the scoop S is arranged at an angle to the lower portion thereof, as shown clearly in Fig. VII, said upper portion having side walls 12 and 12', which are arranged at an angle to the side walls 7, and a solid bottom wall 13. The portion S' of the scoop is so arranged that its open end is located at one side of the scoop whereby any articles which pass through the scoop will be discharged therefrom at the side of said scoop. 14 designates a guard bar which is secured to the side wall 12' of the portion S' of the scoop, said guard bar being adapted to prevent articles within the scoop from falling over the wall 12'.

15 designates a pair of bars which are secured to the lowermost side of the scoop S, there being one of said bars at each side of said scoop, as shown in Fig. V. The bars 15 are both of the same length and support a transverse shaft 16 at their upper ends. The bars 15 are secured to the scoop in any suitable manner, such as by means of brackets 17 (Fig. I), so that said bars will move with said scoop. Pivotally secured to the side members of the rectangular frame B at points indicated by the reference character 19 is a pair of arms 20, the upper ends of said arms being provided with openings through which the shaft 16 passes. By referring to Fig. II it will be seen that the ends of the arms 20 which are pivotally secured to the frame B are arranged within the spaces 2, bolts 21 being passed through spaced apart bars which make up the side members of the frame, and through the lower ends of said arms, as shown in the view mentioned. The arms 20 are connected together by a cross member 22, whereby rigidity is added to the structure.

23 designates a second pair of arms, each of which is pivotally supported by the rear axle C of the apparatus. The ends of the arms 23 which are opposite to the ends attached to the frame B of the apparatus are each provided with an elongated opening 24ª through which pins 24', fixed to the bars 15, pass, whereby said ends of said arms are connected to said bars 15. By referring to Fig. II it will be seen that the arms 23 are provided with bifurcated rear end portions which straddle the ground wheels D and the parts of the frame B located immediately adjacent to said ground wheels, said bifurcated portions of said arms being provided with hub portions adapted to encircle the axle C. It is apparent from this that the forward ends of the arms 23 are capable of swinging in an arc of a circle about the shaft C.

Secured to the front member 5 of the rectangular frame B is a vertical plate 24, which has secured to it a member 25 provided with a hook-shaped portion 26 (Fig. I). The hook-shaped portion 26 of the member 25 is so positioned and of such size that the bushings 10 surrounding the shaft 9 rest in said hook-shaped portion, whereby the scoop S is supported. Supported by the member 25 is a block 27 which extends transversely of the apparatus, said block being of such size that when the scoop S is the position in which it is shown in Figs. I and VIII the rear faces 11' of the bars 11 will contact with said block.

Arranged adjacent to the rear end of the apparatus is a transverse shaft 28 on which is mounted a comparatively small gear wheel 29 which meshes with a larger gear wheel 30 on a transverse shaft 31. The shaft 31 is provided with a drum 32 around which is wound a cable 33. Supported in suitable bearings at a point above the shaft 31 is a transverse shaft 34 provided with a sheave 35 over which the cable 33 passes. Fixed to the cross member 22 is a hook 36 to which is attached a block 37. The cable 33 passes from the drum 32, over the sheave 35, and then forwardly through the block 37, after which said cable passes rearwardly to a point adjacent to the transverse shaft 34, at which point the end of said cable is attached by being secured to a member 38 supported by said transverse shaft 34 (Figs. I and II).

Arranged at one end of the shaft 28 is a pair of pulleys 39 and 40, the pulley 39 being fixed to said shaft 28 and the pulley 40 being an idle pulley capable of rotating idly about said shaft. 41 designates a belt which passes over one of the pulleys 39 or 40 and over a pulley 42 to which rotary movement is imparted by a power-generating device, which will be hereinafter described. Located at the opposite end of the transverse shaft 28 is a ratchet wheel 43 with which is associated a dog 44, as shown in Fig. VI. In view of this arrangement it is apparent that the shaft 28 may be rotated in one direction when the dog 44 is in the position in which it is shown in Fig. VI, but it is also plain that the dog 44 will prevent rotation of said shaft in the opposite direction. Located on the shaft 28 intermediate of the ratchet wheel 43 and the gear wheel 29 is a drum 45, around which is arranged a friction band 46. The ends of the friction band 46 are secured to a bell crank lever 47 fixed to a transverse shaft 48, said bell crank lever being so arranged that rotation of the shaft 48 will cause the friction band 46 to be drawn tightly about the drum 45, whereby free rotation of the shaft 48 is prevented.

Pivotally secured to a fixed member 49 secured to a stationary part of the apparatus is an arm 50, the free end of which extends to a point adjacent to the seat of the operator of the apparatus. Located at one end of the shaft 48 is an arm 51 which is connected to the pivoted arm 50 by means of a connecting member 52, whereby vertical movement of the arm 50 will impart rotary movement to the shaft 48. Arranged at the opposite end of the shaft 48 is a trigger 53 having a finger 54 which underlies the dog 44, said finger being adapted to move the forward portion of the dog 44 upwardly against the action of the spring 55 when the shaft 48 is rotated, whereby said forward portion of said dog will be disengaged from the teeth of the ratchet wheel 43.

56 designates a belt-shifting arm which is pivotally secured to a fixed member 57, said belt-shifting arm being provided with a pair of spaced apart downwardly extending pins 58, which are arranged adjacent to the opposite side edges of the belt 41. When it is desired to shift the belt 41 from the fixed pulley 39 to the idle pulley 40, or from the idle pulley 40 to the fixed pulley 39, the pivoted arm 56 is shifted laterally and the pins 58 on said pivoted arm will move the belt 41 from one pulley to the other.

Located within the rectangular frame B is a power-generating device, preferably a tractor T. The tractor T is of the usual construction, having traction wheels 60 and steerable wheels 61 which may be controlled by a steering wheel 62 through the operation of steering mechanism 63, shown by dotted lines in Fig. II. The tractor T is connected to the rectangular frame B of the apparatus by means of connecting members 64 and 65. As will be seen by referring to Fig. II of the drawings, there is a connecting member 64 at each side of the tractor, said connecting members each comprising an inverted U-shaped member, the downturned ends of which pass through eyes attached to the tractor and to the frame B of the apparatus. The downturned ends of the connecting member 64 are provided with nuts 66 to prevent said connecting members from being accidentally disengaged from the eyes with which they are associated. The connecting member 65 comprises a bowed member having downturned end portions which pass through eyes secured to a cross member 67 extended from one side member 1 of the frame B to the other side member thereof, and said connecting member 65 is attached to a portion of the tractor by means of the member 68. The downturned end portions of the connecting member 65 are provided with nuts 69 to prevent accidental displacement of said downturned portions from the eyes through which they pass. It is apparent from the foregoing that the tractor T is flexibly connected to the frame of the apparatus, said tractor being capable of moving relative to the frame of the apparatus in response to irregularities in the surface of the ground over which the apparatus passes.

In the operation of my improved farming apparatus, said apparatus is driven along a row of shocks of grain in the field. As each shock of grain is encountered by the apparatus the pointed ends of the bars 11 pass under said shock of grain, and it is moved into the scoop S. When the shock of grain is located in the scoop S the shifter arm 56 is shifted to move the belt 41 from the idle pulley 40 to the fixed pulley 39. The pulley 42 is constantly rotated by certain mechanism forming a part of the tractor, consequently when the belt 41 is shifted as described rotary motion will be imparted to the shaft 48, from which shaft rotary motion will be imparted through the gears 29 and 30 to the shaft 31. When the shaft 31 is rotated the cable 33 is wound about the drum 31 on said shaft, whereby the scoop S will be drawn upwardly to the position in which it is shown by dotted lines in Fig. I, in which position the bottom wall of the scoop is inclined toward the rear of the apparatus. It is plain from this that any bundles of grain which are within the scoop S will slide rearwardly and will strike the inclined side wall 12′, whereby they will be deflected laterally through the open end of the scoop and into the vehicle which travels beside the apparatus.

When the grain has been dumped from the scoop S as described and it is desired to return the said scoop to its original position, the pivoted arm 50 is depressed. This will cause the shaft 48 to be rotated slightly, whereby the finger 54 will elevate the forward portion of the dog 44, thus disengaging said portion of said dog from the teeth of the ratchet wheel 43. When the dog 44 has been disengaged from the ratchet wheel 43 as described, the scoop S is permitted to move downwardly, unwinding the cable from the drum 32 as said downward movement takes place. When the pivoted arm 50 was depressed to release the dog 44 from the ratchet wheel 43 the friction band was simultaneously caused to frictionally grip the drum 45 on the shaft 28, whereby a too rapid descent of the scoop is prevented.

By referring to Fig. VIII it will be seen that the faces 11′ at the rearmost ends of the bars 11 are in contact with the transverse block 27. In view of this arrangement it is plain that any rearward thrusts to which the bars 11 are subjected will be transmitted directly to said block 27, which is well able to withstand said thrusts, and said thrusts will not be imparted to the long arms 23. To insure against the transmission of longitudinal thrusts to the arms 23, I provide the ends of said arms with the elongated openings 24ª already mentioned, which permit the pins 24′ to move longitudinally of said arms a limited distance.

An important feature of my invention resides in the fact that the tractor T may be readily disengaged from the apparatus when it is desired to use said tractor for some other purpose, it only being necessary to remove the nuts 66 and 69 from the downturned portions of the connecting members 64 and 65, whereupon said downturned portions may be lifted from within the associated eyes. After the tractor has been detached from the rectangular frame B of the apparatus as described, the front member 5 of the frame B is removed from said frame, after which the tractor T may be driven from within the frame B, the scoop S having previously been raised to the position in which it is shown in dotted lines in Fig. I.

When it is desired to move the apparatus along a highway or from one field to another, the bars 11 at the lower end of the scoop S may be moved to the positions in which they are shown by dotted lines in Fig. I.

I claim:

1. A farming apparatus comprising a scoop adapted to gather articles as it is moved along the ground, means whereby the inclination of the bottom wall of said scoop is changed so as to cause the articles within said scoop to slide rearwardly, and means comprising an angularly arranged wall of said scoop with which the articles contact whereby the direction of travel of said articles is changed so that said articles are discharged from said scoop in a lateral direction with respect to said apparatus and entirely beyond said apparatus.

2. A farming apparatus comprising a scoop adapted to gather articles as it is moved along the ground, said scoop comprising a portion which is in alinement with the direction of travel of said scoop and a portion which is arranged at an angle to the first mentioned portion, and means whereby said scoop is tilted to cause the articles gathered by said scoop to be discharged from said angularly arranged portion at a side of said scoop, the discharge end of said angularly arranged portion being so located that said articles are discharged entirely beyond the apparatus.

3. A farming apparatus comprising a scoop adapted to gather articles as it is moved along the ground, said scoop comprising a portion which extends parallel with the longitudinal axis of the apparatus and a portion which is arranged at an angle to said longitudinal axis of the apparatus, and means whereby said scoop is tilted to cause the articles gathered by said scoop to be discharged from said angularly arranged portion at a side of said scoop, the discharge end of said angularly arranged portion being so located that said articles are discharged entirely beyond the apparatus.

4. A farming apparatus comprising a scoop adapted to gather articles as it is moved along the ground, said scoop comprising a portion which is in alinement with the direction of travel of said scoop and a portion which is arranged at an angle to said first mentioned portion, and means whereby said scoop may be tilted to cause the articles gathered by said scoop to be discharged from said angularly arranged portion at one side of the scoop, said means comprising a flexible member attached to said scoop, and means for causing said flexible member to move longitudinally, the discharge end of said angularly arranged portion being so located that said articles are discharged entirely beyond the apparatus.

5. A farming apparatus comprising a scoop adapted to gather articles as it is moved along the ground, said scoop comprising a portion which is in alinement with the direction of travel of said scoop and a portion which is arranged at an angle to said first mentioned portion, and means whereby said scoop may be tilted to cause the articles gathered by said scoop to be discharged from said angularly arranged portion at one side of the scoop, said means comprising a cable attached to said scoop, and a drum around which said cable is wound, the discharge end of said angularly arranged portion of said scoop being so located that said articles are discharged entirely beyond the apparatus.

6. A farming apparatus comprising a scoop adapted to gather articles as it is moved along the ground, said scoop comprising a portion which is in alinement with the direction of travel of said scoop and a portion which is arranged at an angle to said first mentioned portion, and means whereby said scoop may be tilted to cause the articles gathered by said scoop to be discharged from said angularly arranged portion at one side of the scoop, said means comprising a cable attached to said scoop, a drum around which said cable is wound, said drum being rotated in one direction to draw said scoop upwardly and rotated in another direction to permit said scoop to move downwardly, and means for preventing the too rapid descent of said scoop, the discharge end of said angularly arranged portion of said scoop being so located that said articles are discharged entirely beyond the apparatus.

7. A farming apparatus comprising a scoop adapted to gather articles as it is moved along the ground, said scoop comprising a portion which is in alinement with the direction of travel of said scoop and a portion which is arranged at an angle to said first mentioned portion, and means whereby said scoop may be tilted to cause the articles gathered by said scoop to be discharged from said angularly arranged portion at one side of the scoop, said means comprising a cable attached to said scoop, a drum around which said cable is wound, said drum being rotated in one direction to draw said scoop upwardly and rotated in another direction to permit said scoop to move downwardly, and friction means for preventing the too rapid descent of said scoop, the discharge end of said angularly arranged portion of said scoop being so located that said articles are discharged entirely beyond the apparatus.

8. A farming apparatus comprising a scoop adapted to gather articles as it is moved along the ground, said scoop comprising a portion which is in alinement with the direction of travel of said scoop and a portion which is arranged at an angle to said first mentioned portion, and means whereby said scoop may be tilted to cause the articles gathered by said scoop to be discharged from said angularly arranged portion at one side of the scoop, said means comprising a cable attached to said scoop, a drum around which said cable is wound, means comprising a detent whereby said drum may be prevented from rotating in a direction to unwind said cable, braking means whereby too rapid movement of said scoop is prevented, and means whereby said detent is rendered inoperative and said braking mechanism rendered operative simultaneously, the discharge end of said angularly arranged portion of said scoop being so located that said articles are discharged entirely beyond the apparatus.

9. A farming apparatus comprising a scoop adapted to gather articles as it moves along the ground, and means whereby said scoop is moved to cause the articles within said scoop to be discharged therefrom, said scoop being provided with a plurality of pivotally supported bars at its forward end capable of independent pivotal movement.

10. A farming apparatus comprising a scoop adapted to gather articles as it moves along the ground, pivoted arms for supporting said scoop, means whereby said scoop is moved to cause the articles within said scoop to be discharge therefrom, and an abutment member comprising an elongated block arranged adjacent to said scoop and adapted to receive thrusts from said scoop.

In testimony that I claim the foregoing I hereunto affix my signature.

FRANK E. RICHEY.